(12) United States Patent
Ito

(10) Patent No.: US 9,593,738 B2
(45) Date of Patent: Mar. 14, 2017

(54) ACTIVE VIBRATION ISOLATION DEVICE

(71) Applicant: KEIHIN CORPORATION, Tokyo (JP)

(72) Inventor: Yuji Ito, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 0 days.

(21) Appl. No.: 14/857,972

(22) Filed: Sep. 18, 2015

(65) Prior Publication Data

US 2016/0084338 A1    Mar. 24, 2016

(30) Foreign Application Priority Data

Sep. 24, 2014 (JP) ................................. 2014-194040

(51) Int. Cl.
*F16F 15/00* (2006.01)
(52) U.S. Cl.
CPC .................................. *F16F 15/005* (2013.01)
(58) Field of Classification Search
CPC .......... F16F 15/005; F16F 15/03; F16F 15/04; F16F 7/1011
USPC ......... 267/140.14, 140.15, 140.3, 141, 141.1
See application file for complete search history.

(56) References Cited

U.S. PATENT DOCUMENTS

| | | | | |
|---|---|---|---|---|
| 3,344,397 A * | 9/1967 | Elliott | ..................... | G01V 1/181 267/160 |
| 8,616,536 B2 * | 12/2013 | Kim | ....................... | F16F 7/1011 188/267 |
| 2004/0017033 A1 * | 1/2004 | Ichikawa | ................. | F16F 7/108 267/140.14 |
| 2008/0007125 A1 * | 1/2008 | Koyama | ................ | F16F 7/1011 267/140.14 |
| 2008/0060894 A1 * | 3/2008 | Koyama | ................ | F16F 7/1011 188/379 |
| 2009/0079114 A1 * | 3/2009 | Muraoka | ................. | F16F 13/26 267/140.14 |
| 2011/0180980 A1 * | 7/2011 | Urayama | ............... | F16F 7/1011 267/140.14 |
| 2015/0198216 A1 * | 7/2015 | Koyama | ............. | H02K 41/035 267/140.14 |

FOREIGN PATENT DOCUMENTS

JP        2011-153671 A        8/2011

* cited by examiner

*Primary Examiner* — Melanie Torres Williams
(74) *Attorney, Agent, or Firm* — Westerman, Hattori, Daniels & Adrian, LLP

(57) ABSTRACT

An active vibration isolation device includes: a housing fixed to a vibration isolation target; a movable shaft elastically supported by the housing displaceably in an axial direction; a yoke having an umbrella-shaped part provided consecutively and coaxially with the movable shaft and a circular cylindrical part provided consecutively with an outer circumference of the umbrella-shaped part and coaxially with the movable shaft; a ring-shaped coil fixed between the movable shaft and the cylindrical part; and first and second permanent magnets in a ring shape attached to the yoke. The first permanent magnet is smaller in diameter than the coil and is disposed inside the coil in a radial direction of the coil. The second permanent magnet is larger in diameter than the coil and is disposed outside the coil in the radial direction so that part thereof is made to face an inside of the yoke.

3 Claims, 1 Drawing Sheet

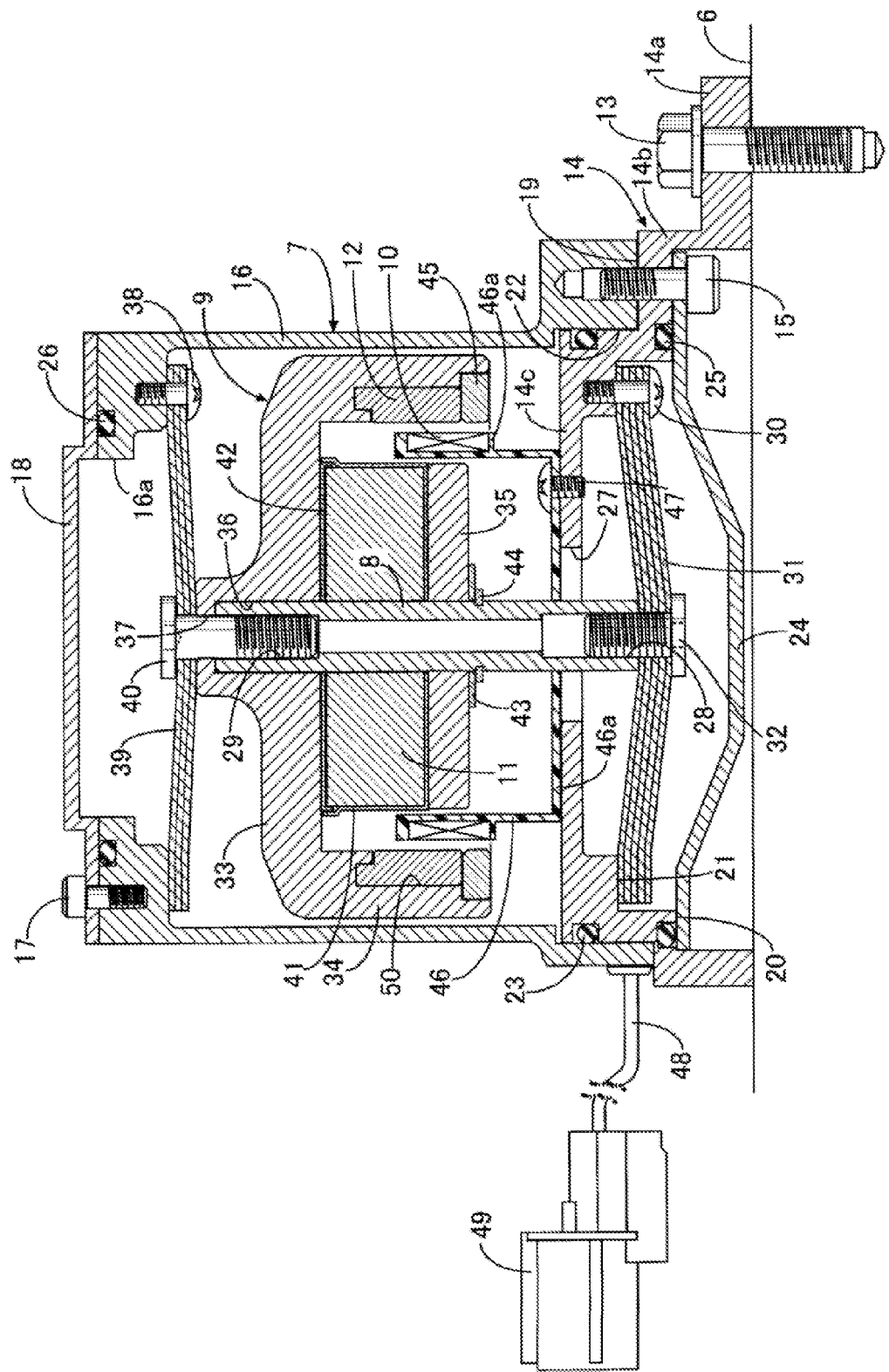

ACTIVE VIBRATION ISOLATION DEVICE

CROSS REFERENCE TO RELATED APPLICATION

The present application claims priority under 35 U.S.C. §119 to Japanese Patent Application No. 2014-194040 filed in the Japan Patent Office on Sep. 24, 2014, the entire content of which is hereby incorporated by reference.

TECHNICAL FIELD

The present invention relates to art active vibration isolation device including a housing fixed to a vibration isolation target, a movable shaft elastically supported by the housing displaceably in an axial direction, a yoke having an umbrella-shaped part provided consecutively and coaxially with the movable shaft and a circular cylindrical part provided consecutively with an outer circumference of the umbrella-shaped part and coaxially with the movable shaft, a ring-shaped coil that is disposed between the movable shaft and the circular cylindrical part and is fixed to the housing, and permanent magnets disposed to the yoke.

BACKGROUND OF THE INVENTION

An active vibration isolation device in which a single ring-shaped permanent magnet disposed inside a coil in the radial direction of the coil is attached to a yoke is known due to Japanese patent laid-open publication No. 2011-153671 ("JP '671").

SUMMARY OF THE INVENTION

There is a demand to increase the thrust exerted by the active vibration isolation device. In the case of the active vibration isolation device disclosed in JP '671, increasing the size of the permanent magnet will be a solution to meet this demand. However, merely increasing the size of the permanent magnet causes increase in the size of the active vibration isolation device.

The present invention provides an active vibration isolation device that can achieve increase in the thrust with avoidance of increase in the size.

According to the present invention, an active vibration isolation device includes a housing fixed to a vibration isolation target, a movable shaft elastically supported via an elastic member by the housing displaceably in an axial direction, and a yoke having an umbrella-shaped part (a flange) provided consecutively and coaxially with the movable shaft and a circular cylindrical part (a side wall) provided consecutively with an outer circumference of the umbrella-shaped part and coaxially with the movable shaft. The active vibration isolation device further includes a ring-shaped coil that is disposed between the movable shaft and the circular cylindrical part and is fixed to the housing, a first permanent magnet attached to the yoke, and a second permanent magnet attached to the yoke. The first permanent magnet is formed into a ring shape having a smaller diameter than the coil and is disposed inside the coil in a radial direction of the coil, and the second permanent magnet is formed into a ring shape having a larger diameter than the coil and is disposed outside the coil in the radial direction of the coil in such a manner that part of the second permanent magnet is made to face an inside of the yoke. In one embodiment, the first ring-shaped permanent magnet, the ring-shaped coil and the second ring-shaped permanent magnet are coaxially provided with one another and radially aligned with one another at least in part thereof such that the portion of the movable shaft, the first ring-shaped permanent magnet and the second ring-shaped permanent magnet is actuated typically in a reciprocating manner by the coil corresponding to vibrations of the vibration isolation target, thereby suppressing the vibrations.

According to the present invention, the first and second permanent magnets are disposed inside and outside in the radial direction of the coil, respectively. This increases the density of magnetic flux generated by the coil, which can achieve increase in the thrust. In addition, the second permanent magnet is disposed on the circular cylindrical part of the yoke in such a manner that part of the second permanent magnet is faced toward the inside of the yoke. Thus, this placement of the second permanent magnet can increase the density of magnetic flux, while avoiding increase in the size of the active vibration isolation device, thereby to maintain the device to be compact especially in the radial direction.

BRIEF DESCRIPTION OF THE DRAWING

The advantages of this invention will become apparent in the following description taken in conjunction with the drawing, wherein:

FIG. 1 is a longitudinal sectional view of an active vibration isolation device.

DETAILED DESCRIPTION OF THE INVENTION

One embodiment of the present invention will be described with reference to accompanying FIG. 1. This active vibration isolation device is disposed on a vehicle body frame 6 as a vibration isolation target equipped with an engine of e.g. a car. The active vibration isolation device includes a housing 7 fixed to the vehicle body frame 6, a movable shaft 8 elastically supported by the housing 7 displaceably in an axial direction, a yoke 9 provided consecutively and coaxially with the movable shaft 8, a ring-shaped coil 10 fixed to the housing 7, and a first permanent magnet 11 and a second permanent magnet 12 that are disposed to the yoke 9.

The housing 7 is composed of a base body 14 fixed to the vehicle body frame 6 by plural first bolts 13, a circular cylindrical body 16 whose one end part is fixed to the base body 14 by plural second bolts 15, and a lid plate 18 that closes the other end part of the circular cylindrical body 16 and is fixed to the circular cylindrical body 16 by plural third bolts 17.

The base body 14 is formed to monolithically have the following parts: a flange part 14a fastened to the vehicle body frame 6 by a first bolt 13; a stepped circular cylindrical part 14b that is so formed that its one end part is continuous with the flange part 14a and its diameter becomes smaller in a stepwise manner as the distance from the vehicle body frame 6 becomes longer; and an inward brim part 14c extending inward in a radial direction from the other end of this stepped circular cylindrical part 14b. At an outer circumference of the stepped circular cylindrical part 14b, an outside step part 19 facing the opposite side to the vehicle body frame 6 is formed. At an inner circumference of the stepped circular cylindrical part 14b, a first inside step part 20 facing, the side of the vehicle body frame 6 and a second inside step part 21 that is disposed closer to the inward brim part 14c than the first inside step part 20 and faces the side of the vehicle body frame 6 are formed.

At the one end part of the circular cylindrical body 16, a fitting recess 22 is coaxially formed. The other end side of the stepped circular cylindrical part 14b in the base body 14 is fitted into the fitting recess 22, with the one end of the circular cylindrical body 16 made to abut against the outside step part 19, and the one end part of the circular cylindrical body 16 is fastened to the outside step part 19 by a second bolt 15. In addition, a ring-shaped first sealing member 23 in resilient contact with an inner circumference of the fitting recess 22 is mounted at an outer circumference of the other end side of the stepped circular cylindrical part 14b.

An outer circumferential part of a lower lid member 24 is fastened to the first inside step part 20 of the base body 14 by the second bolt 15. Thus, the one end part of the circular cylindrical body 16 and the outer circumferential part of the lower lid member 24 are fastened to the base body 14 by co-fastening by the second bolt 15. In addition, along the radial direction of the base body 14 and inside the second bolt 15, a ring-shaped second sealing member 25 in resilient contact with the lower lid member 24 is mounted to the first inside step part 20.

An inward brim part 16a is monolithically provided at the other end part of the circular cylindrical body 16 and an outer circumferential part of the lid plate 18 is fastened to the inward brim part 16a by a third bolt 17. In addition, along the radial direction of the lid plate 18 and inside the third bolt 17, a ring-shaped third sealing member 26 in resilient contact with an inner surface of the lid plate 18 is mounted on an outer surface of the inward brim part 16a.

The movable shaft 8 is formed into a circular tubular shape coaxially penetrating through an opening 27 formed by an inner circumference of the inward brim part 14c in the base body 14. A screw hole 28 is coaxially made at a lower part of this movable shaft 8 and a screw hole 29 is coaxially made at an upper part of the movable shaft 8.

An outer circumferential part of a first plate spring 31 to first elastic member) in a state in which plural springs are overlapped with each other is fastened to the second inside step part 21 of the base body 14 by plural first screw members 30. A central part of this first plate spring 31 is made to abut against a lower end part of the movable shaft 8 and a fourth bolt 32 inserted in the central part of the first plate spring 31 is screwed into the screw hole 28 at the lower part of the movable shaft 8. That is, the lower part of the movable shaft 8 is elastically supported movably in the axial direction by the base body 14 of the housing 7 with the intermediary of the first plate spring 31.

The yoke 9 is configured to include an umbrella-shaped part 33 provided consecutively and coaxially with the movable shaft 8, a circular cylindrical part 34 provided consecutively and monolithically with an outer circumference of the umbrella-shaped part 33 and coaxially with the movable shaft 8, and a ring body 35 fixed and disposed at a position separate from the umbrella-shaped part 33 in a direction along the axis line of the movable shaft 8.

In the umbrella-shaped part 33, the following recess and hole are coaxially made: a fitting recess 36 opened at a central part of an inner surface of the umbrella-shaped part 33 to allow the upper part of the movable shaft 8 to be fitted into the fitting recess 36; and an insertion hole 37 having one end part opened to a closed end of the fitting recess 36 and the other end part opened to a central part of an outer surface of the umbrella-shaped part 33. Meanwhile, an outer circumferential part of a second plate spring 39 (a second elastic member) in a state in which plural springs are overlapped with each other is fastened to the inward brim part 16a of the circular cylindrical body 16 by plural second screw members 38. A central part of this second plate spring 39 is made to abut against the central part of the outer surface of the umbrella-shaped part 33. A fifth bolt 40 is inserted in the central part of the second plate spring 39 and the insertion hole 37 of the umbrella-shaped part 33. The fifth bolt 40 is screwed into the screw hole 29 of the movable shaft 8 in the state of being fitted into the fitting recess 36. By tightening the fifth bolt 40, the umbrella-shaped part 33 is made consecutive with the movable shaft 8 and the movable shaft 8 and the yoke 9 are elastically supported movably in the axial direction by the circular cylindrical body 16 of the housing 7 with the intermediary of the second plate swing 39.

The first permanent magnet 11 is formed into a ring shape coaxial with the movable shaft 8. The first permanent magnet 11 may be formed into a ring shape as a single magnet. Alternatively, the first permanent magnet 11 may be one that can be divided into a pair of magnet pieces or more plural magnet pieces in a circumferential direction. It suffices for the first permanent magnet 11 to be formed into a ring shape when being assembled to the yoke 9.

This first permanent magnet 11 is housed in a holder 41 formed into a thin-walled, bottomed circular cylindrical shape and an opening end of this holder 41 is closed by a cover 42 having a thin circular plate shape. The holder 41 and the cover 42 are formed by a non-magnetic material. The holder 41 is disposed in the circular cylindrical part 34 coaxially, with the cover 42 made to abut against the inner surface of the umbrella-shaped part 33. The movable shaft 8 penetrates the holder 41 and the cover 42 in addition to the first permanent magnet 11.

The ring body 35 penetrated by the movable shaft 8 is formed to have an outer diameter corresponding to that of the holder 41, and is so disposed that the holder 41, in which the first permanent magnet 11 is housed, and the cover 42 are interposed between the ring body 35 and the inner surface of the umbrella-shaped part 33. Furthermore, a washer 43 having a ring plate shape is made to abut against a central part of the ring, body 35 from the opposite side to the umbrella-shaped part 33 and a retaining ring 44 that clamps this washer 43 with the ring body 35 is mounted to an outer circumference of the movable shaft 8. The ring body 35 is thereby made consecutive with the umbrella-shaped part 33 with the intermediary of the holder 41, in which the first permanent magnet 11 is housed, and the cover 42, so that the yoke 9 is formed. In addition, the first permanent magnet 11 is attached to the yoke 9.

The second permanent magnet 12 is formed into a ring, shape having a larger diameter than the first permanent magnet 11 and is attached to the yoke 9. As with the first permanent magnet 11, the second permanent magnet 12 may be formed into a ring shape as a single magnet. Alternatively, the second permanent magnet 12 may be one that can be divided into a pair of magnet pieces or more plural magnet pieces in the circumferential direction. It suffices for the second permanent magnet 12 to be formed into a ring shape when being assembled to the yoke 9.

The second permanent magnet 12 is attached to the circular cylindrical part 34, with part thereof made to face an inner circumference of the circular cylindrical. part 34. In the circular cylindrical part 34, a ring-shaped attaching recess 50 opened to the inner circumferential side of the circular cylindrical part 34 and to the opposite side to the umbrella-shaped part 33 is made. The second permanent magnet 12 fitted into the attaching recess 50 is clamped by the circular cylindrical part 34 and a ring-shaped retaining plate 45 press-fitted into an end part of the circular cylindrical part 34 on the opposite side to the umbrella-Shaped part 33.

To the inward brim part 14c of the base body 14 in the housing 7, a bobbin 46 having a ring-shaped coil winding part 46a disposed between the first permanent magnet 11 and the second permanent magnet 12 is fixed by plural third screw members 47. The movable shaft 8 penetrates a central part of the bobbin 46 movably in the axial direction.

The coil 10 is wound around the coil winding part 46a of the bobbin 46 and is fixed to the base body 14 of the housing 7 with the intermediary of the bobbin 46. This coil 10 is disposed between the movable shaft 8 and the circular cylindrical part 34. Thus, the first permanent magnet 11 is formed into a ring shape having a smaller diameter than the coil 10 and is disposed inside the coil 10 in the radial direction of the coil 10. Furthermore, the second permanent magnet 12 is formed into a ring shape having a larger diameter than the coil 10 and is disposed outside the coil 10 in the radial direction of the coil 10.

A coupler 49 is disposed at an outer end part of a conductive line 48 that is continuous with the coil 10 and is led to the outside from the housing 7.

Next, the operation of this embodiment will be described. The first permanent magnet 11, which is formed into a ring shape having a smaller diameter than the coil 10 and is disposed inside the coil 10 in the radial direction of the coil 10, and the second permanent magnet 12, which is formed into a ring shape having a larger diameter than the coil 10 and is disposed outside the coil 10 in the radial direction of the coil 10, are attached to the yoke 9. Thus, the first and second permanent magnets 11 and 12 are disposed inside and outside in the radial direction of the coil 10. This increases the density of magnetic flux generated by the coil 10, which can achieve increase in the thrust.

In addition, the second permanent magnet 12 is disposed to the inner circumferential surface of the circular cylindrical part 34 forming part of the yoke 9 so that part of the second permanent magnet 12 faces radially inside, thereby to face an outer circumferential surface of the coil 10. This configuration with that placement of the second permanent magnet 12 has the benefit to make the active vibration isolation device more powerful, while avoiding increase in the site in diameters of the first permanent magnet 11 and the coil 10, and thus can avoid increase in the size of the active vibration isolation device.

Although the embodiment of the present invention is described above, the present invention is not limited to the above embodiment and various design changes can be made without departing from the present invention set forth in the scope of claims.

I claim:

1. An active vibration isolation device comprising:
    a housing fixed to a vibration isolation target;
    a movable shaft supported by the housing via an elastic member that allows the movable shaft to move in an axial direction thereof;
    a yoke coaxially provided with the movable shaft and having an umbrella-shaped part radially extending from the movable shaft and a cylindrical wall part axially extending from an outer circumference of the umbrella-shaped part;
    a first ring-shaped permanent magnet attached to the yoke;
    a ring-shaped coil that is fixed to the housing and disposed radially outside relative to the first ring-shaped permanent magnet; and
    a second ring Shaped permanent magnet attached to an inner surface of the cylindrical wall part of the yoke so as to face radially inward and disposed radially outside relative to the ring-shaped coil.

2. The active vibration isolation device according to claim 1, wherein the first ring-shaped permanent magnet is fixed at one axial end thereof to an inner surface of the umbrella-shaped part.

3. The active vibration isolation device according to claim 1, wherein the vibration isolation target is a body frame of a vehicle.

* * * * *